United States Patent
Power, II et al.

(10) Patent No.: US 11,504,556 B2
(45) Date of Patent: Nov. 22, 2022

(54) BRIDGE ROPE ASSEMBLY

(71) Applicant: Tethrd LLC, Carver, MN (US)

(72) Inventors: Walter Ernest Power, II, Carver, MN (US); Gregory Alan Godfrey, Richmond Hill, GA (US); Carl Eugene Kossuth, III, Rolla, MO (US)

( * ) Notice: Subject to any disclaimer, the term of this patent is extended or adjusted under 35 U.S.C. 154(b) by 0 days.

(21) Appl. No.: 17/231,717

(22) Filed: Apr. 15, 2021

(65) Prior Publication Data

US 2021/0228923 A1    Jul. 29, 2021

Related U.S. Application Data

(63) Continuation of application No. 17/022,844, filed on Sep. 16, 2020, now abandoned, and a continuation of application No. 16/736,345, filed on Jan. 7, 2020, now abandoned.

(51) Int. Cl.
   *A62B 35/00*    (2006.01)

(52) U.S. Cl.
   CPC ...... *A62B 35/0075* (2013.01); *A62B 35/0037* (2013.01)

(58) Field of Classification Search
   CPC .............. A62B 35/0037; A62B 35/0075; D07B 1/185; D07B 1/148; D07B 1/162; D04C 1/12

See application file for complete search history.

(56) References Cited

U.S. PATENT DOCUMENTS

| | | | | |
|---|---|---|---|---|
| 330,087 A | * | 11/1885 | Bins | F16G 3/00 57/201 |
| 2,303,954 A | * | 12/1942 | Roke | E04G 21/3276 248/228.7 |
| 2,600,395 A | * | 6/1952 | Domoj | D07B 1/185 124/90 |
| 3,738,449 A | * | 6/1973 | Arancio | A62B 35/0037 182/7 |
| 4,036,101 A | * | 7/1977 | Burnett | F16G 11/14 87/8 |
| 4,099,750 A | * | 7/1978 | McGrew | D07B 1/185 114/221 R |
| 4,962,929 A | * | 10/1990 | Melton, Jr. | A63B 69/38 224/267 |
| 5,050,704 A | * | 9/1991 | Olsson | A62B 35/0018 182/135 |

(Continued)

FOREIGN PATENT DOCUMENTS

| DE | 455971 C | * | 2/1928 | ......... A62B 35/0075 |
|---|---|---|---|---|
| FR | 1602226 A | * | 10/1970 | ............. D07B 1/162 |

(Continued)

*Primary Examiner* — Daniel P Cahn
*Assistant Examiner* — Candace L Bradford (57) ABSTRACT

A bridge rope assembly includes a main body comprising a rope that has a first end and a second end. The rope has a splice therein to form an eye loop in the main body. The eye loop is configured to engage a first bridge loop of a harness. The main body comprises a first portion including the first end and a second portion including the second end. The first portion extends through the second portion of the main body such that the first end is positioned adjacent to the second end. A distance between the first and second ends is less than 2.0 inches.

1 Claim, 9 Drawing Sheets

(56) References Cited

U.S. PATENT DOCUMENTS

| | | | | |
|---|---|---|---|---|
| 5,062,344 A * | 11/1991 | Gerker | ............... | D07B 1/185 87/8 |
| 5,699,657 A * | 12/1997 | Paulson | ............... | D07B 1/185 57/22 |
| 5,970,697 A * | 10/1999 | Jacobs | ............... | F16L 3/137 57/22 |
| 6,712,181 B2 * | 3/2004 | Nichols | ............... | A62B 1/16 182/5 |
| 7,182,361 B2 * | 2/2007 | Lewoczko | ............... | B66F 1/00 254/131 |
| 7,814,938 B2 * | 10/2010 | Davis, Jr. | ............... | A62B 1/16 174/115 |
| 8,061,479 B2 | 11/2011 | Harris, Jr. | | |
| 8,292,028 B2 | 10/2012 | Wise | | |
| 8,356,691 B2 | 1/2013 | Griffith | | |
| 8,584,799 B1 | 11/2013 | Dennington | | |
| 9,162,091 B2 * | 10/2015 | Kuhnert | ............... | A62B 35/0068 |
| 9,320,925 B2 | 4/2016 | Wise | | |
| 9,808,659 B2 | 11/2017 | Chevalier | | |
| 10,258,814 B2 | 4/2019 | Casebolt | | |
| 10,604,892 B1 * | 3/2020 | Caliri | ............... | D07B 1/148 |
| 2007/0102240 A1 * | 5/2007 | Wilson | ............... | A62B 1/16 182/5 |
| 2008/0000719 A1 * | 1/2008 | Jones | ............... | A62B 35/0075 182/3 |
| 2008/0179136 A1 | 7/2008 | Griffith | | |
| 2009/0255756 A1 | 10/2009 | Green | | |
| 2010/0213004 A1 * | 8/2010 | Petty | ............... | A62B 35/0068 182/5 |
| 2015/0297937 A1 * | 10/2015 | Burkinshaw | ............... | A63B 23/1218 482/139 |
| 2021/0101032 A1 * | 4/2021 | Power, II | ............... | A62B 35/0012 |

FOREIGN PATENT DOCUMENTS

| | | | | |
|---|---|---|---|---|
| GB | 1420783 A * | 1/1976 | ......... | A62B 35/0037 |
| WO | WO2018111624 | 6/2018 | | |

* cited by examiner

BRIDGE ROPE ASSEMBLY

CROSS-REFERENCE TO RELATED APPLICATIONS

This application is a continuation application and I hereby claim the benefit under 35 U.S.C. Section 120 of U.S. patent application Ser. No. 16/736,345 filed Jan. 7, 2020 and U.S. patent application Ser. No. 17/022,844 filed Sep. 16, 2020.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to harness rope structures and more particularly pertains to a new harness rope structures for utilizing eye splices having fully buried rope ends which extend completely into their mating counterparts a sufficient distance such that a double layer of rope is created. It has been found that such a construction allows high strength materials that are otherwise susceptible to heat/friction damage, or are of such low friction that they do not typically retain a closed loop formation under stress, to be used safely for harness bridge ropes.

(2) Description of Related Art Including Information Disclosed Under 37 CFR 1.97 and 1.98

The prior art relates to harness ropes which are generally conventional and utilize rope materials that are of inferior strength but which have a higher coefficient of friction and a higher weight to strength ratio.

BRIEF SUMMARY OF THE INVENTION

An embodiment of the disclosure meets the needs presented above by generally comprising a main body including a rope that has a first end and a second end. The rope has a splice therein to form an eye loop in the main body. The eye loop is configured to engage a first bridge loop of a harness. The main body comprises a first portion including the first end and a second portion including the second end. The first portion extends through the second portion of the main body such that the first end is positioned adjacent to the second end. A distance between the first and second ends is less than 2.0 inches.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
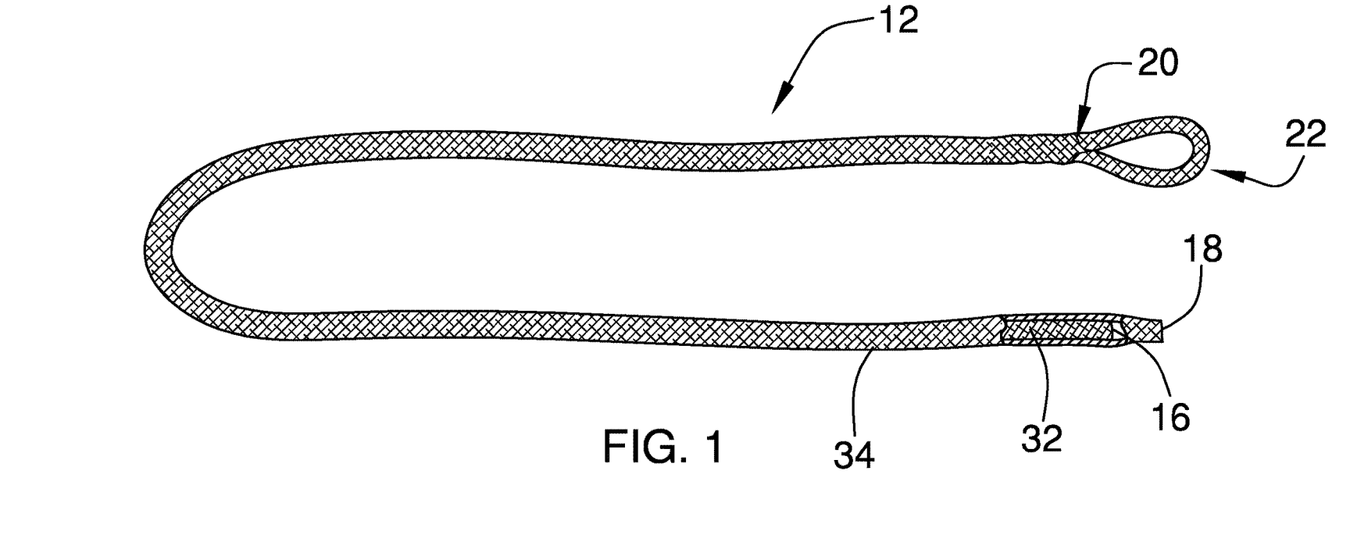
FIG. 1 is a front view of a main body of a bridge rope assembly according to an embodiment of the disclosure.
Figure 2:
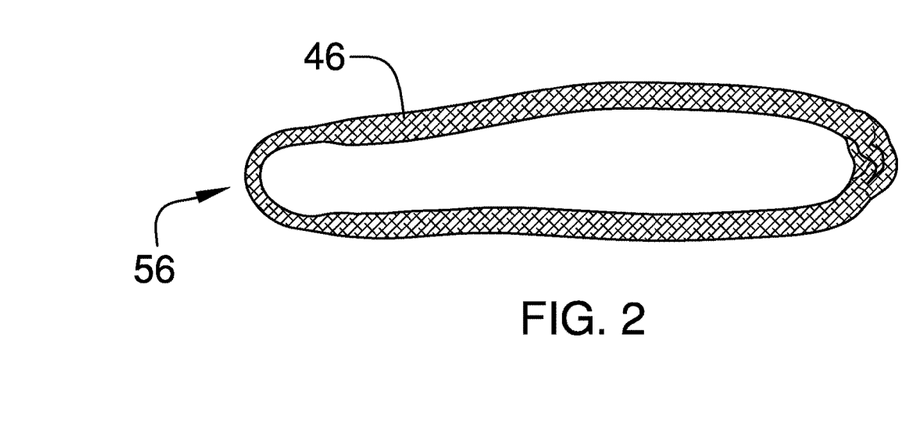
FIG. 2 is a front view of a closed loop of an embodiment of the disclosure.
Figure 3:
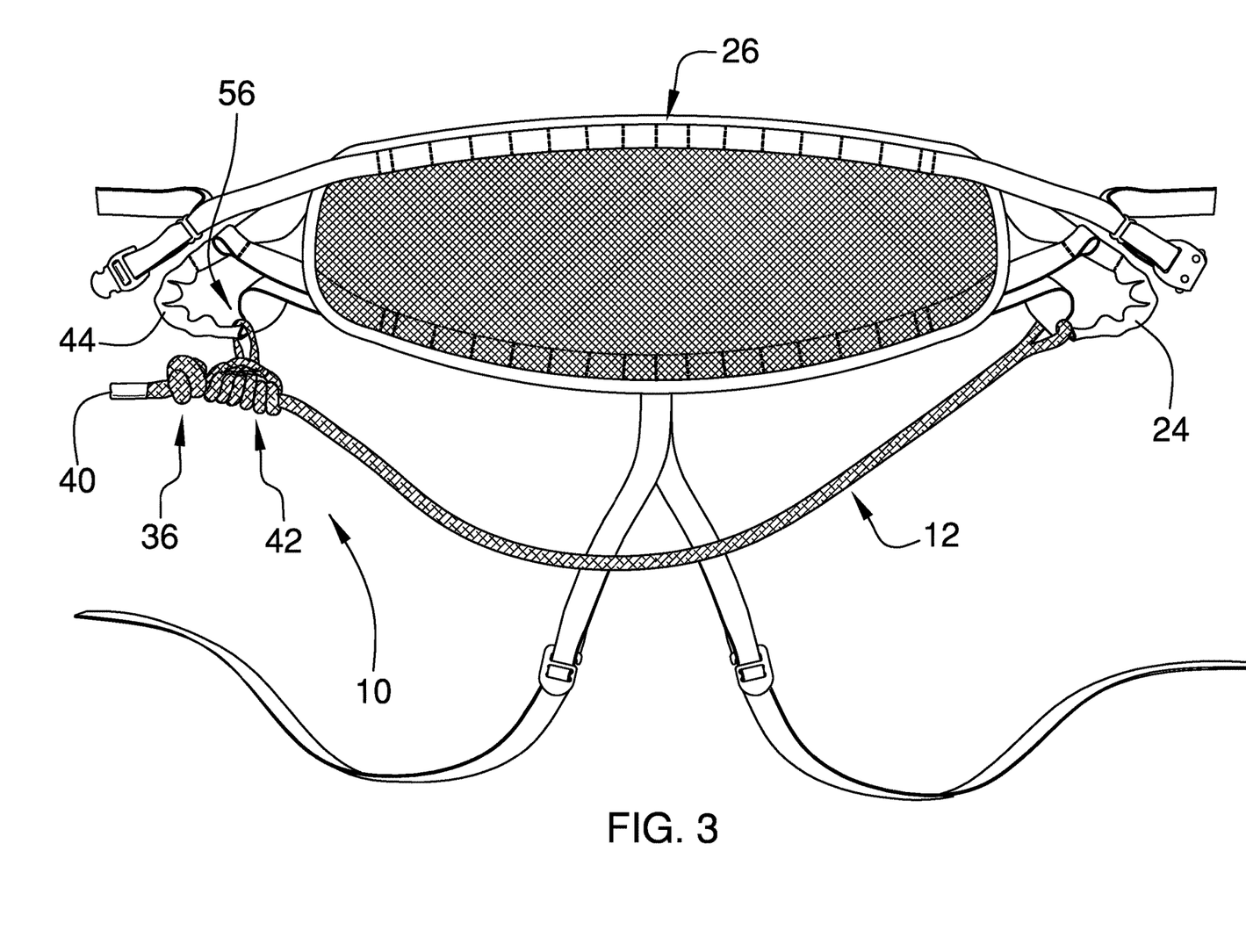
FIG. 3 is a front in-use view of an embodiment of the disclosure.
Figure 4:
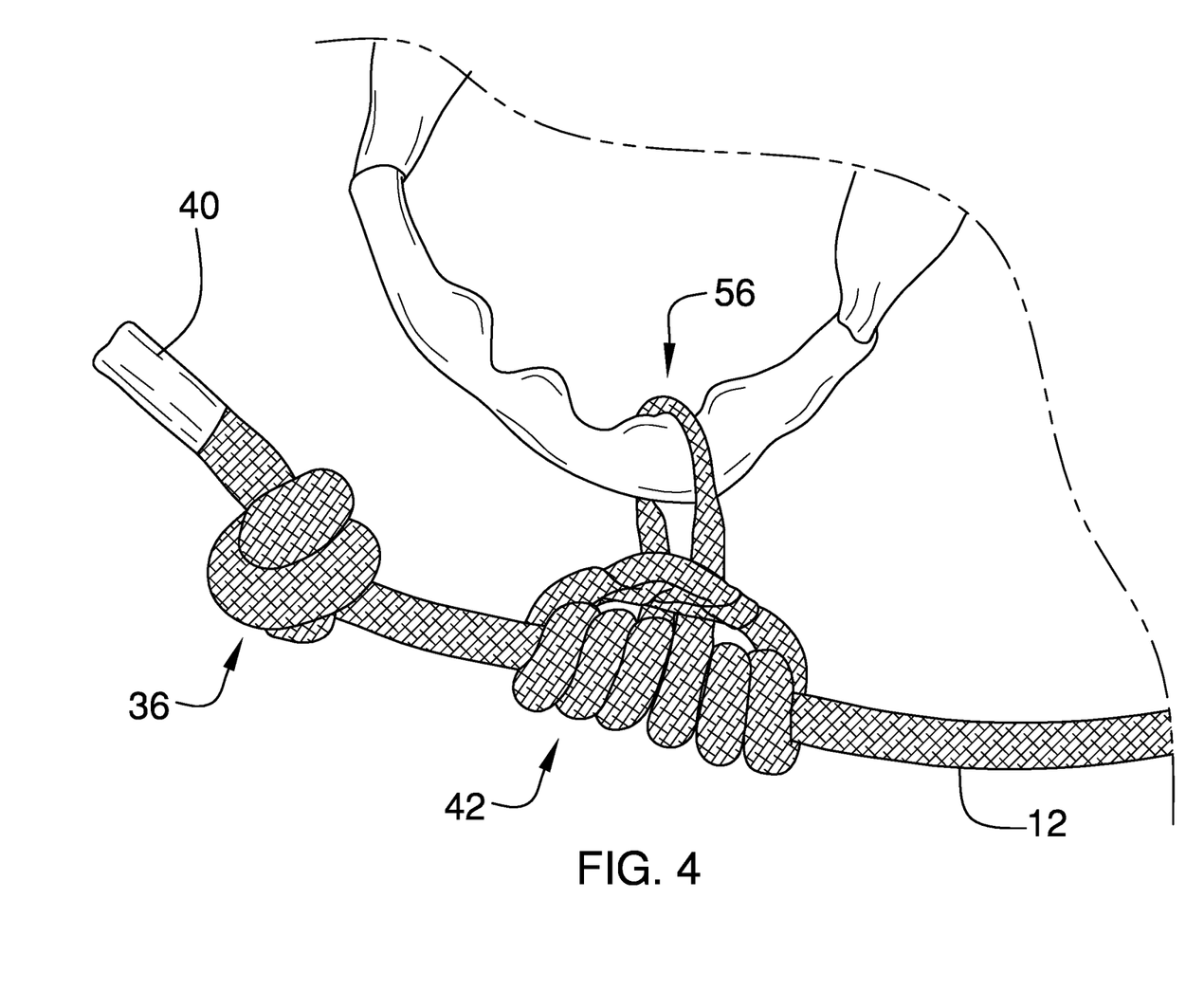
FIG. 4 is a front in-use view of an embodiment of the disclosure.
Figure 5:
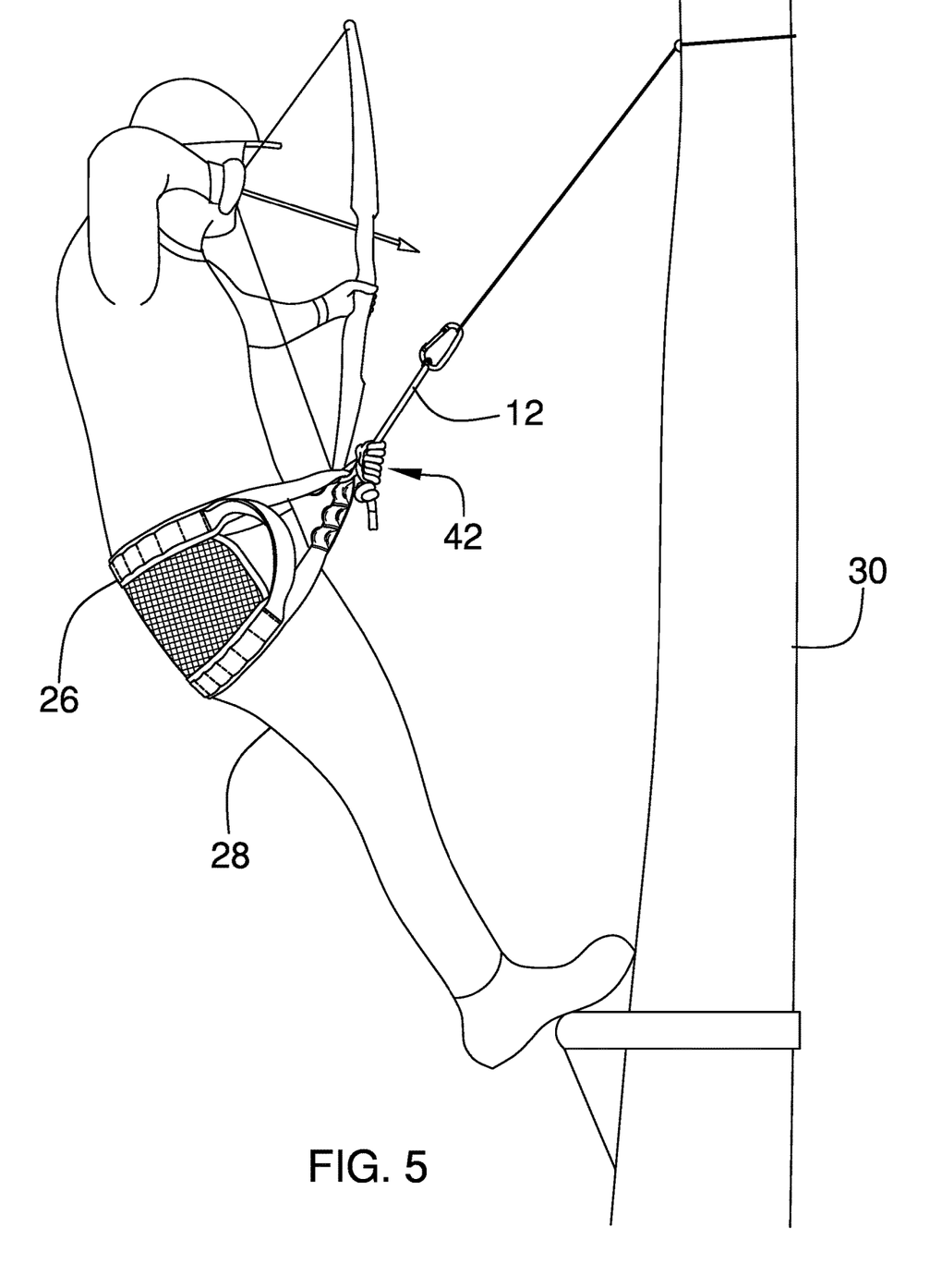
FIG. 5 is a side in-use view of an embodiment of the disclosure.
Figure 6:
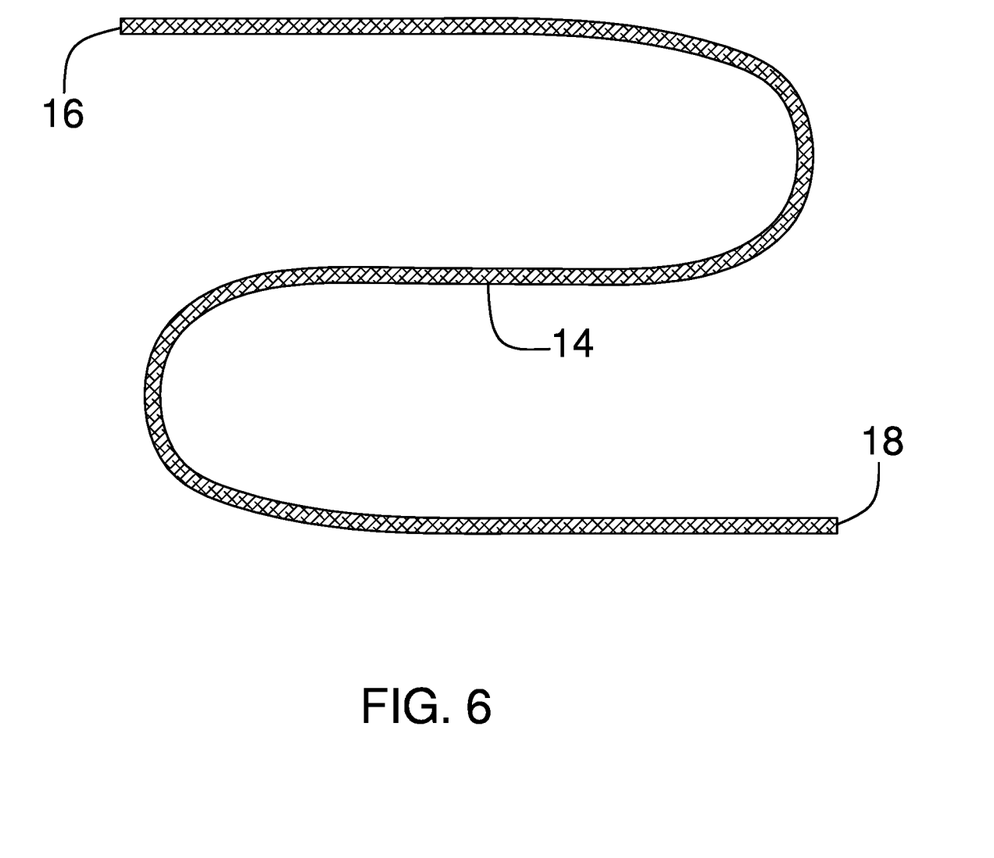
FIG. 6 is a front view of a rope used in forming a main body of an embodiment of the disclosure.
Figure 7:
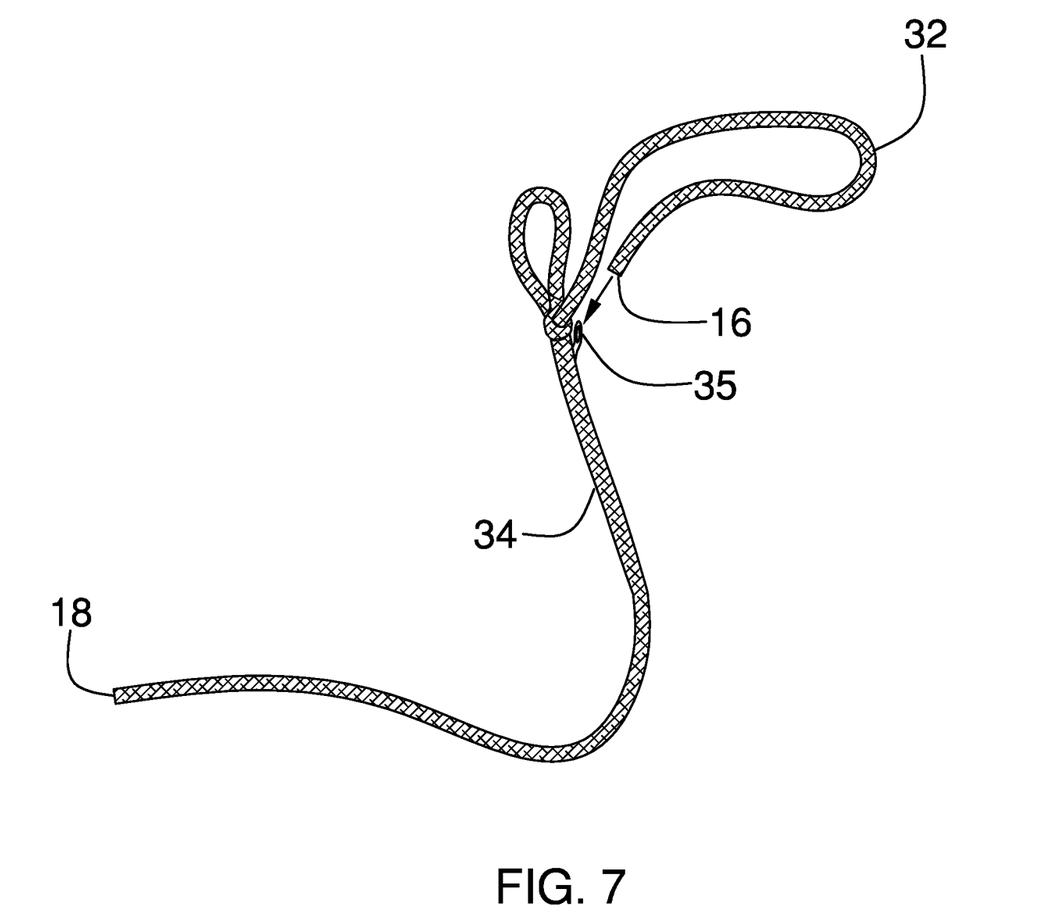
FIG. 7 is a front view of a step in forming the main body of an embodiment of the disclosure.
Figure 8:
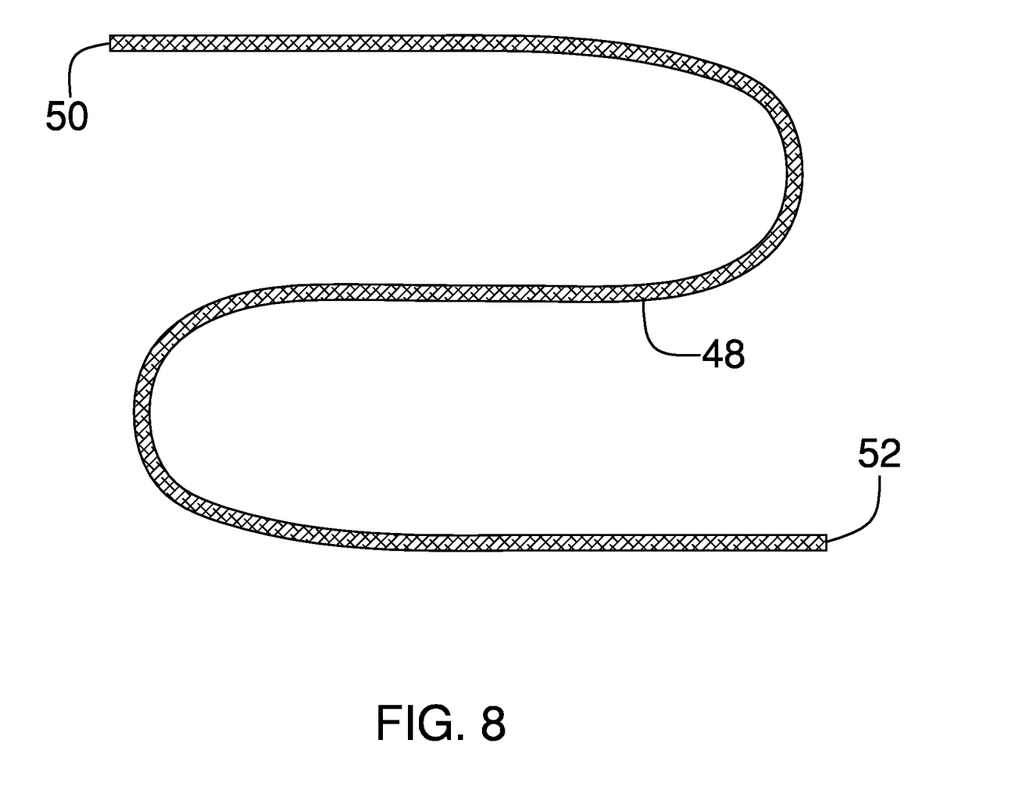
FIG. 8 is a front view of a single rope used in forming a friction hitch of an embodiment of the disclosure
Figure 9:
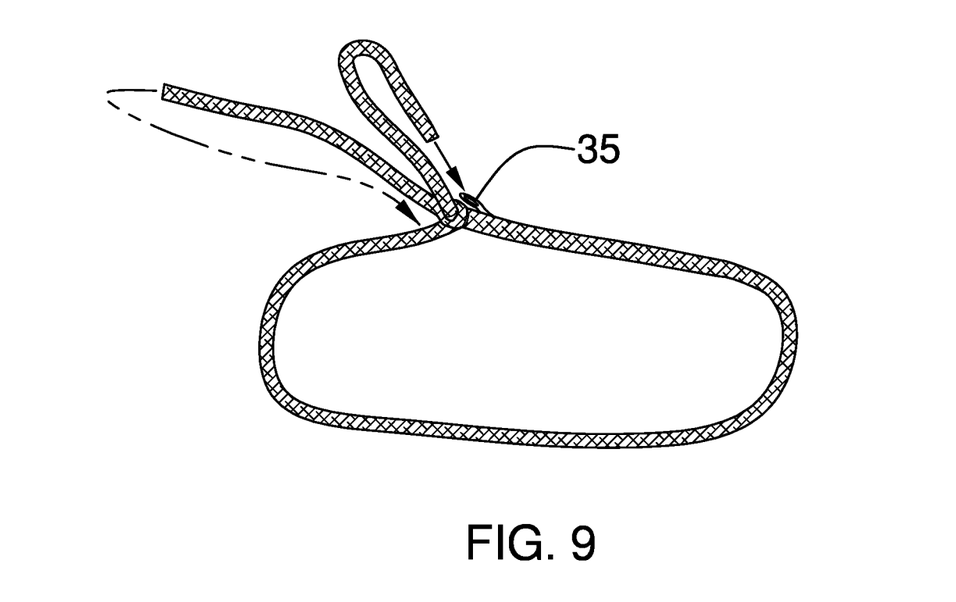
FIG. 9 is a front view of a step in forming a continuous loop of an embodiment of the disclosure.
Figure 10:
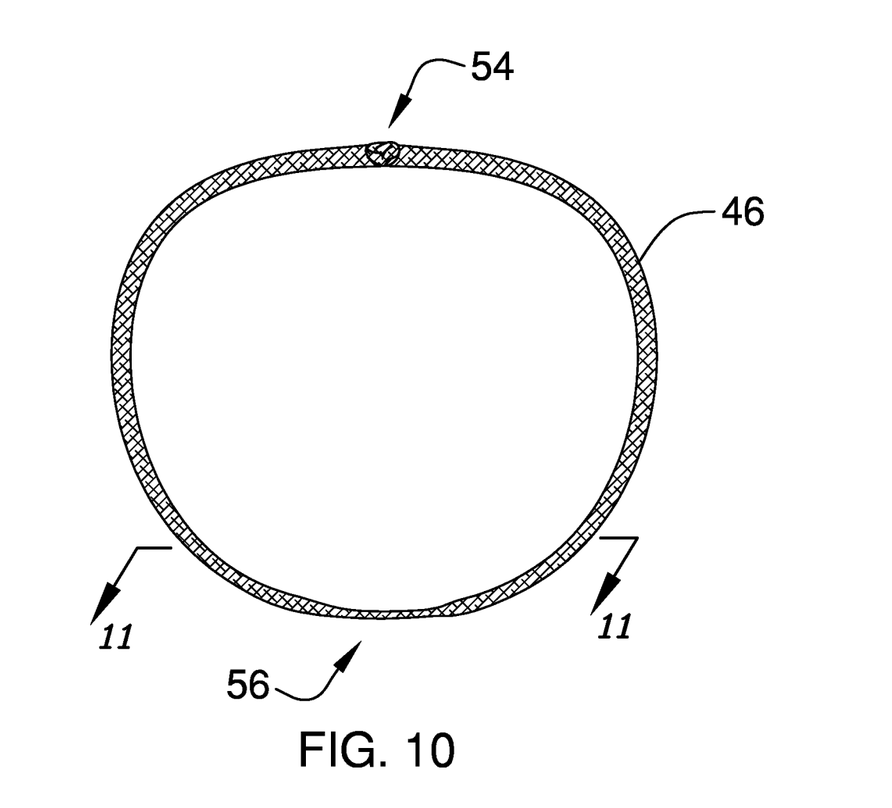
FIG. 10 is a front view of the continuous loop of an embodiment of the disclosure
Figure 11:
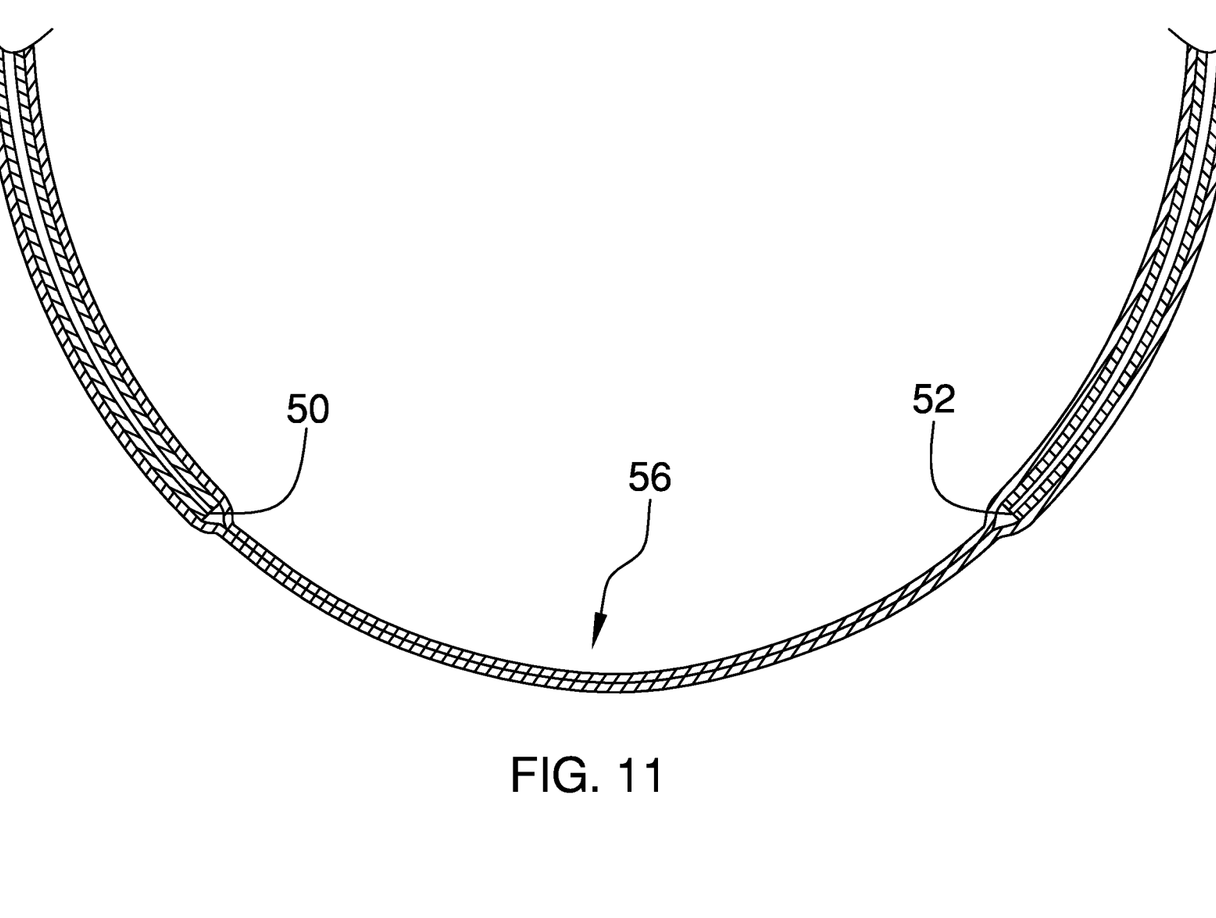
FIG. 11 is a cross-sectional view taken along line 11-11 of FIG. 10 of an embodiment of the disclosure.

With reference now to the drawings, and in particular to FIGS. 1 through 11 thereof, a new harness rope structure embodying the principles and concepts of an embodiment of the disclosure and generally designated by the reference numeral 10 will be described.

As best illustrated in FIGS. 1 through 11, the bridge rope assembly 10 generally includes a main body 12, as shown in FIGS. 1, 4, 6 and 7, comprising a rope 14 that has a first end 16 and a second end 18. The main body 12 has a splice 20 therein to form an eye loop 22 in the main body 12. The splice 20 may be a straight splice or a locked brummel splice. Each is well known in the art of rope manipulation within the harness arts. Generally, a locked brummel splice may be preferred as any buried tags (portions of rope extended within another portion of rope) cannot back themselves out as they are effectively "locked" in place with a knot. A downside of the locked brummel is the knot itself at the splice 20 which creates a bulge in the rope where the knot is formed. Buried tags that are the product of a straight splice are not locked in place and therefore can back themselves out when not under tension. However, a straight splice can be secured in place by stitching the resultant tag(s) in place once the tag is in a buried condition if desired. Generally, as it will be understood below, it is the splice 20 which creates one or two tags which is important.

The eye loop 22 is configured to engage a first bridge loop 24 of a harness 26 utilized to support a person 28 secured to a tree 30. After the formation of the eye loop, the main body 12 comprises a first portion 32 including the first end 16 and a second portion 34 including the second end 18. The first portion 32 is then extended through the second portion 34 of the main body 12 by threading the first end 16 into the second portion 34 adjacent to the eye loop 22. The first end 16 of a conventional buried tag, i.e. first portion 32, is typically retained within the second portion 34 in close proximity to the eye loop 22. However, in the current disclosure, the eye loop 22 is positioned proximate a central area of the rope 14 such that the first end 16 can be extended adjacently to the second end 18, wherein the first 32 and second 34 portions each extend away from the eye loop 22. The first end 16 will typically remain within the second portion 34 and will be located less than 2.0 inches from the second end 18.

The main body 12 includes a stop knot 36 in the second portion 34 adjacent to the second end 18 and therefore the stop knot 36 further includes the first portion 32 adjacent to the first end 16. The stop knot 36 may comprise, for example, a double fisherman's knot.

The juncture of the first 16 and second 18 ends may be covered with a securing member or otherwise bonded together with known methods and/or mechanical structures. These may include mechanical stitching, staples, glue, friction/heat bonding and the like. One type of securing member may comprise a heat shrink wrap sleeve having an interior coated with an adhesive to ensure a strong bond between the sleeve and the main body 12. The sleeve will extend in opposite directions away from a juncture of the first end 16 and the second portion 34 to ensure that that the first end 16 does not move relative to the second portion 34 and protects the juncture from damage, such as for example from fraying. After the shrink wrap is heated and adhered to the second portion 34, the extra length of section portion 34 extending beyond the first end 16 may be removed such that the first 16 and second 18 ends are flush with each other.

The rope 14 may have a length from the first end 16 to the second end 18 between 72.0 inches and 126.0 inches. The main body 12 may further comprise a 0.25 inch braided rope though other rope diameters are contemplated with the width being typically less than 0.50 inches and generally at least 0.1875 inches. The second end 18 extends away from the eye loop 22 between 0.5 inches and 3.0 inches farther away than the first end 16 extends away from the eye loop 22, and more preferably less than 2.0 inches farther away. It should be understood that the first end 16 may extend outwardly of the second portion 34 a short distance and either be trimmed back such that it is flush with or within 1.0 inches of the second end 18 and thereafter secured in place. The burying of the first portion 32 within the second portion 34 may be facilitated with conventional threading/splicing tools 35. Increased friction between the first 32 and second 34 portions due to the increased diameter of the second portion 34 prevents movement of the first 32 and second 34 portions relative to each other to minimize mechanical failure. The increased diameter of the second portion 34 will also result in increased friction between the main body 12 and a friction hitch positioned on the main body 12. This minimizes mechanical failure of the bridge rope assembly 10 during standardized drop testing.

The main body 12 is comprised of a polyethylene, and in particular ultra high molecular weight polyethylene, typically known as UHMWPE. This material characteristically includes extremely long chains of polyethylene having 100,000 to 250,000 monomer units per molecule. Such material is available from numerous suppliers. One such material is sold under the trademark Amsteel. Amsteel is a trademark of Samson Rope Technologies, Inc. located at 2090 Thorton Street, Ferndale, Wash. This material may be blended with other materials; however, the rope may consist solely of UHMWPE. UHMWPE, while extremely strong, has a very low coefficient of friction. Therefore the extension of the first portion 32 through the second portion 34 further resists the movement of the first portion 32 outwardly away from the second portion 34 while increasing a thickness of main body 12 such that it may be gripped easier.

In one embodiment, the main body 12 comprises a rope that is 95.0 inches long and is comprised of 0.25 inch diameter Amsteel. A splice 20 is created and a locked brummel used such that a 39.0 inch tag line (first portion 32) is formed which is buried into what will be an approximately 50.0 inch remainder (second portion 34) of the rope 14. The widening of the second portion 34 to accept the first portion 32 causes the second portion 34 to shorten in length which allows the first portion 32 to nearly extend through the second portion 34. Shrink wrap 40 is then applied over the second 34 portion at a juncture of the first end 16 and second portion 34. It is heated to form a bond with the second portion 34 and compresses the first 32 and second 34 portions together. After the shrink wrap is heated and adhered to the second portion 34, the extra length of the second portion 34 extending beyond the first end 16 may be removed such that the first 16 and second 18 ends are flush with each other. The stop knot 36 is formed in the main body 12 adjacent to the shrink wrap 40 by way of a double fisherman's knot. The distance from the stop knot 36 to the eye loop 22 is approximately 31.0 inches.

A friction hitch 42, as shown particularly in FIGS. 2, 4, and 9-11, is positioned on the main body 12 between the stop knot 36 and the eye loop 22. The friction hitch 42 is formed in a conventional manner and is configured to engage a second bridge loop 44 of the harness 26. The friction hitch 42 comprises a closed loop 46. The closed loop 46 is comprised of a single rope 48 that is formed into a continuous splice using a conventional method except wherein a pair of ends (first end 50 and second end 52) of the single rope 48 are each buried into the closed loop 46 a distance of at least 40% of a total circumference of the closed loop 46, more particularly between 40% and at least 50% of the total circumference, though, for reasons stated below, a distance of less than 50% may be preferred.

Using conventional methods, the closed loop 46 is formed at with a splice 54 drawn together by ends 50 and 52 being drawn through the splice 54. As with the main body 12, the splice 54 may be a locked brummel splice 54 or a straight splice with the same disadvantages as mentioned above except with two tag lines, as shown in FIG. 9, instead of one. The first 50 and second 52 ends are then drawn through, or buried, in the continuous loop 46 with the first end 50 being positioned on one side of the locked splices 54 and the second end 52 being positioned on the other side of the locked splices 54. The first 50 and second 52 ends are thereby extending toward each other within the closed loop 46. However, they will typically remain spaced apart a distance of between 1.0 and 4.0 inches to create a narrow area 56 in the continuous loop 46 having a diameter that is less than a remainder of the continuous loop 46. Thus, the ends 50, 52 are each buried typically at least 40% and less than 50% of the total circumference of the continuous loop leaving the narrow area 56 to include less than 100% and greater than 80% of the total circumference.

The single rope 48 of the closed loop 46 has a length between 40.0 inches and 60.0 inches and the closed loop 46 will typically have a total circumference of between 20.0 inches and 30.0 inches. The single rope 48 may further comprise a 3/16 inch braided rope, though other rope diameters are contemplated with the width being typically less than 0.50 inches and generally at least 0.125 inches. As with the main body 12, the friction hitch 42 is comprised of UHMWPE. By burying the first 50 and second 52 ends of the single rope 48 through a majority of the closed loop 46, the closed loop 46 will resist damage caused by movement of the first 50 and second 52 ends within closed loop 46 while ensuring that the closed loop 46 remains intact.

In one specific example of the friction hitch 42, the single rope 48 is 47.0 inches long and is comprised of a 3/16 inch diameter of Amsteel rope, a type of braided rope comprised of UHMWPE. A brummel is formed 13.5" from a center point of the single rope 48 with tag ends of the single rope 48 each being buried to form a resultant closed loop 46 having a circumference from 22" to 24" depending on the stretch of the single rope 46 as it is formed into the closed loop 46. The narrow area 56 has a length being equal to between 3.0 inches and 4.0 inches. The closed loop 46 is formed into the friction hitch using what is commonly referred to as a Prusik knot.

In use, the eye loop 22 of the main body 12 is engaged on the first bridge loop 24 of the harness 26. The friction hitch 42 is formed in a conventional manner on the main body 12 and second bridge loop 44. The friction hitch 42 is positioned between the eye loop 22 and knot 36. The friction hitch 42 is conventional and can be selectively loosened and moved along the main body 12. However, the materials and structure of the main body 12 and friction hitch 42 will prevent failure and allow UHMWPE materials to be used in such a manner that they will pass standardized drop tests. The narrow portion 56 of the closed loop 46 will typically be engaged with the second bridge loop 44 and its narrow diameter will assist in locking it in grooves in the second bridge loop 44 should such be provided.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A bridge rope assembly configured to couple together a tree rope to a first bridge loop and a second bridge loop on a harness, the bridge rope assembly including:

a main body comprising a rope having a first end and a second end, the main body having a splice therein to form an eye loop in the main body, the eye loop being configured to engage the first bridge loop, the main body comprising a first portion including the first end and a second portion including the second end, the first portion extending through the second portion of the main body such that the first end is positioned within the second portion adjacent to the second end, a distance between the first and second ends being less than 2.0 inches, the rope having a length from the first end to the second end between 72.0 inches and 126.0 inches, a distance of the eye loop to the second end being between 24.0 inches and 40.0 inches;

a securing member being positioned on the main body at a juncture of the first and second ends to retain the first and second ends at a static position relative to each other;

the main body including a stop knot in the second portion adjacent to the second end;

a friction hitch being positioned on the main body between the stop knot and the eye loop, the friction hitch being configured to engage the second bridge loop, the friction hitch comprising a closed loop, the closed loop comprising a single rope being formed into the closed loop with a splice, the splice having a pair of ends, each end of the pair of ends being buried into the closed loop a distance of at least 40% of a total circumference of the closed loop, the single rope of the closed loop having a length between 40.0 inches and 60.0 inches, the closed loop having a total circumference of between 20.0 inches and 30.0 inches;

the main body and the friction hitch each being comprised of UHMWPE.

* * * * *